United States Patent [19]
Foster et al.

[11] 3,886,481
[45] May 27, 1975

[54] POWER STABILIZED $CO_2$ GAS TRANSPORT LASER

[75] Inventors: Jack D. Foster, Los Altos; Russell F. Kirk, Sunnyvale; Frederick E. Moreno, Los Altos, all of Calif.; Samir A. Ahmed, New York, N.Y.

[73] Assignee: GTE Sylvania Incorporated, Mountain View, Calif.

[22] Filed: June 11, 1973

[21] Appl. No.: 368,614

[52] U.S. Cl......... 331/94.5 T; 331/94.5 D; 330/4.3
[51] Int. Cl.............................................. H01s 3/22
[58] Field of Search.................. 331/94.5; 330/4.3; 313/174

[56] References Cited
UNITED STATES PATENTS
3,720,885  3/1973  Koloc................................ 331/94.5
3,772,610  11/1973 Foster et al....................... 331/94.5

OTHER PUBLICATIONS
Taylor et al., Applied Physics Letters, Vol. 11, p. 80, Sept. 1967.

Primary Examiner—Robert J. Webster
Attorney, Agent, or Firm—John F. Lawler; Norman J. O'Malley; Elmer J. Nealon

[57] ABSTRACT

The output power of a high power (1 KW or more) $CO_2$ gas transport laser is stabilized by flowing the gas mixture over copper plated baffles in the gas channel during operation of the laser. Several other metals may be used instead of copper, for example, nickel, manganese, palladium, platinum, silver and gold. The presence of copper in the laser gas circuit stabilizes output power by what is believed to be a compensation of the chemical changes in the gas due to the cracking action of the electrical discharge which has the effect of diminishing the capacity of the carbon dioxide gas mixture to maintain the rated power output of the laser.

2 Claims, 2 Drawing Figures

PATENTED MAY 27 1975                                                    3,886,481

3,886,481

POWER STABILIZED CO₂ GAS TRANSPORT LASER

BACKGROUND OF THE INVENTION

This invention relates to gas transport lasers and more particularly to a high power $CO_2$ gas transport laser.

The gas transport laser as described in application Ser. No. 290,545 of J. Foster et al. now U.S. Pat. No. 3,772,610, assigned to the assignee of this invention, is capable of generating output powers in the order of 1 KW or greater by means of a continuous electrical discharge across the flowing gas in the laser cavity. This discharge energizes the molecules of the $CO_2$ mixture which ultimately causes the gas to lase and produces the coherent laser output beam. The gas mixture is recirculated, cooled, and returned to the active lasing region in a closed circuit fluid path.

During operation of the laser, the phenomenon of gradual reduction of laser beam output power without change of input power has been observed. The cause of this power loss is not known but it is believed that it may be the result of a change in the chemical composition of the gas mixture caused by the gas "cracking" action of the high energy discharge. Such instability in the power generating capability of the laser seriously detracts from its utility and increases its cost of operation through frequent replenishment of the gas mixture.

OBJECTS OF THE INVENTION

The general object of the invention is the provision of a high power (1 KW or greater) $CO_2$ gas transport laser having a stable output power level over a long period of time.

A more specific object is the provision of such a laser with inexpensive means for automatically stabilizing the power level of the output beam.

These and other objects of the invention are achieved by exposing the gas mixture circulating within the laser housing to a power stabilizing material which chemically reverses the change in chemical composition of the mixture caused by the high energy discharge. In a preferred embodiment of the invention, this power stabilizer material comprises copper plated duct walls and baffles or turning vanes forming part of the fluid circuit.

DESCRIPTION OF PREFERRED EMBODIMENT

Figure 1:
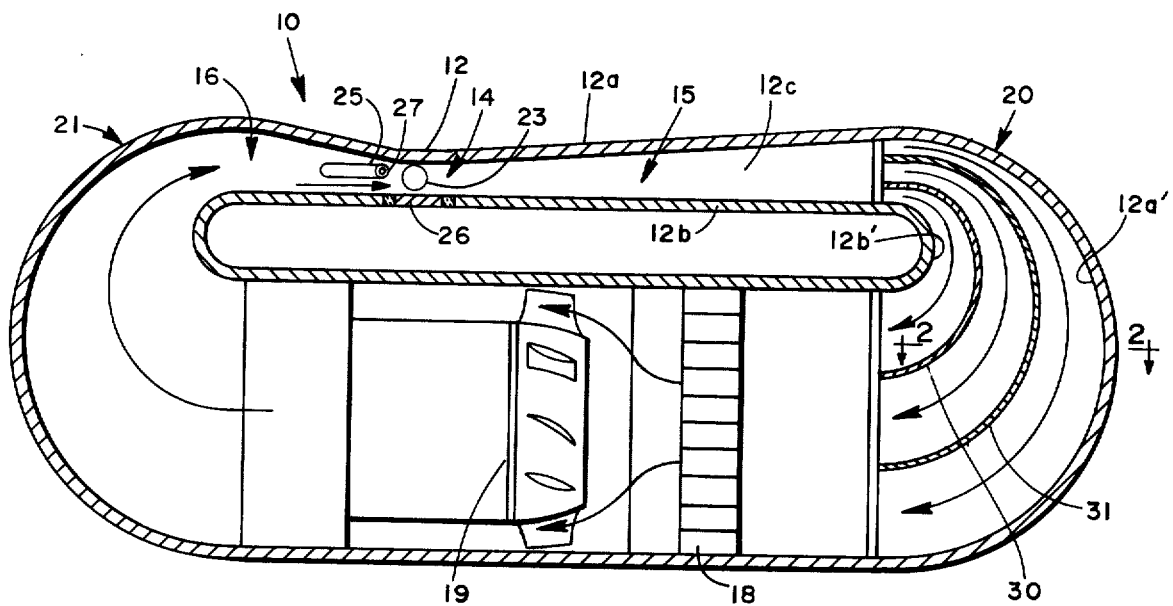
FIG. 1 is a schematic longitudinal vertical section of a closed cycle gas transport laser embodying the invention.
Figure 2:
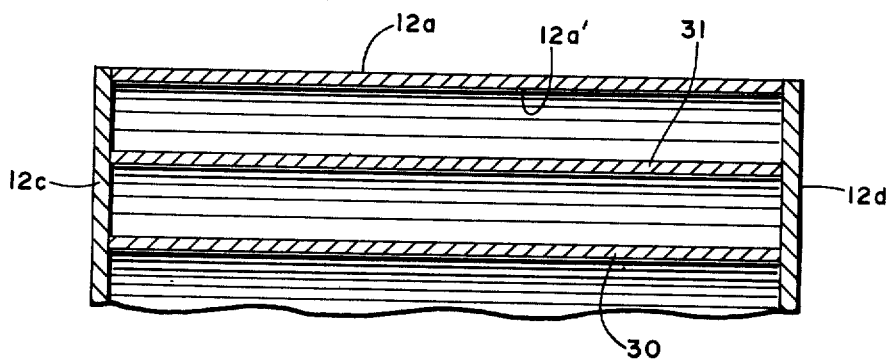
FIG. 2 is a transverse horizontal section taken on line 2—2 of FIG. 1.

Referring now to the drawings, FIG. 1 is a schematic representation of a closed cycle high power gas transport laser system 10 having a channel or duct 12 with an outer wall 12a, an inner wall 12b and side walls 12c and 12d generally configured to define a closed fluid path through which a gas mixture is recirculated in the direction of the arrows. The channel has a rectangular cross-sectional shape and has a narrow or throat section 14 which defines the active or lasing region of the system, a diffuser zone 15 on the downstream side of the active region in which the gas velocity is reduced and a nozzle section 16 upstream from the active region in which the gas velocity is increased prior to entering the throat. The lower portion of the system as shown includes a heat exchanger 18 which removes heat from the gas flowing through it and a vane-axial blower 19 which circulates the gas through the channel. Curved end sections 20 and 21 of the duct smoothly change the direction of flow of the gas between the upper and lower parts of the system.

The gas mixture used in this laser system consists of helium, nitrogen and carbon dioxide in well-known proportions that support lasing action in the active region 14 for producing coherent light at 10.6 microns. Mounted in the side walls of the channel in optical alignment with the lasing region are mirrors, one of which is shown at 23, between which the beam of coherent light is reflected when the system is operated as either an oscillator or an amplifier. In practice, these mirrors are constructed so as to reflect the coherent beam several times through the active region before it exits as the output, thus increasing the effective length of the laser without increasing its physical size.

The electric discharge in the lasing region 14 of the laser occurs between a cathode 25 and an anode 26 which extend transversely of the direction of the flow of gas through the channel for a substantial portion of its width. Cathode 25 preferably comprises a hollow cylindrically tubular conductor spaced inwardly from the top wall 12a and has a portion 27 extending perpendicular to the direction of flow of gas in the channel. The cathode is connected to the negative terminal of an external direct current power supply, not shown. Anode 26 preferably comprises a plurality of segments or pads mounted in channel inner wall 12b in a row generally parallel to and coextensive with the transverse portion 27 of the cathode. The anode pads are described in greater detail in the aforementioned application of J. Foster et al. and accordingly further description of them is not given here. The anode is energized by electrical connection of the anode pads to the positive terminal of the same power supply that is connected to the cathode.

Lasing action in active region 14 of the system is established by the electrical glow discharge between cathode portion 27 and anode 26. The reaction of this continuous glow discharge with the molecules of the gas in the lasing region changes the energy states in the gas so that lasing action occurs and a beam of coherent light is generated in the well known manner. Power in the output laser beam bears a direct relationship to the input power to the system, the conversion efficiency being approximately 5 percent. By way of example, a laser output beam having power of approximately 1 KW was produced in a system having input power of 20 KW.

In the course of operating such high power lasers, a phenomenon of output power instability has been observed. This instability consists of a noticeable decrease in output power during normal continuous operation of the system and without any reduction in input power. By way of example, a gas transport laser producing 1 KW of beam output power was observed to have a continuous decline of power after one hour of operation to 0.6 KW. While a full explanation of this phenomenon is not available, it is believed that the decrease in output power is a result of a change in the chemical composition of the gas mixture caused by the electrical discharge through the gas. The electrical discharge dissociates and ionizes the carbon dioxide and nitrogen with the formation of carbon monoxide, oxygen and free radicals. These free radicals join to form various combinations of carbon, nitrogen and oxygen. The formation of carbon monoxide and oxygen do not cause a reduction in the output power except indirectly by the loss of carbon dioxide molecules. It is believed that some of the various complex $C_xN_yO_z$ molecules more directly cause a reduction in the output power by some loss which is introduced in the quantum molecular chain of events. For example, these molecules may resonantly absorb energy at the upper $CO_2$ laser energy level or they may resonantly absorb 10.6 micron laser photons. In either case the $CO_2$ laser output power would be reduced.

The amount of the reduction in output power as a function of time will depend upon the rate of production and destruction of the lossy species. The production rate is fixed by the discharge parameters which are determined by the conditions for stable and efficient pumping of the laser molecules. The destruction rate will be determined by the chemical equilibrium conditions for the various molecular gases and the reaction rates in the gas flow loop exclusive of the discharge. In the commonly observed case, the laser output power continuously decreases indicating that the production rate of the lossy species exceeds the destruction rate.

In accordance with this invention, the decrease in output power of the laser as a result of this phenomenon is prevented by exposing the hot flowing gas mixture to a selected metal, preferably copper, which reverses the change in chemical composition of the gas caused by the electrical discharge. This is achieved without interrupting the continuous flow of gas through the system by copper plating the interior surfaces $12a'$ and $12b'$ of duct outer and inner walls $12a$ and $12b$, respectively, between the active region and the heat exchanger, preferably in curved end section 20. In addition, longitudinally curved baffles or turning vanes 30 and 31 in end section 20 of the duct are copper plated to further expose the flowing hot gas to the stabilizing effect of the copper.

While the effect of the presence of copper in the gas circuit as a means of reconstituting the original chemical composition of the $CO_2$ mixture is not fully understood, it is believed that the following occurs: The surfaces of the copper are coated with a thin layer of copper oxide (CuO). At the approximately 120°C. temperature of gas downstream of the discharge, CuO is readily reduced by carbon monoxide (CO) with the formation of $CO_2$ and copper (Cu). The free oxygen ($O_2$) on the other hand readily oxidizes Cu at these temperatures, thereby reconstituting the CuO surface layer. This action is represented by the following equations:

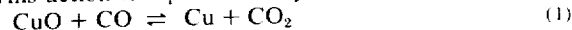  (1)
  (2)

The net result is a large difference in the molecular species with the Cu as compared with apparatus without the Cu. The equilibrium conditions greatly favor $CO_2$ compared to CO and $O_2$, i.e., these conditions favor the right hand side of equation (1). This stops the loss of $CO_2$, thereby preventing power loss due to this mechanism.

Exactly what effect the changed molecular composition has on the complex $C_xN_yO_z$ molecule destruction rate is not known. It is believed, however, that the destruction rate is increased such that a balance can be made with the production rate. The observed result is a steady state power output only slightly reduced from the new gas conditions. By way of example, a gas transport laser producing 1 KW of beam output power and having a copper plated baffled end section was observed to have essentially constant output power for over four hours of continuous operation.

In addition to the use of copper in the practice of this invention, other equivalent metals capable of similarly reacting with the gas mixture for restoring it to its original composition consist of nickel (Ni), manganese (Mn), palladium (Pd), platinum (Pt), silver (Ag) and gold (Au). The oxides of these metals, namely, NiO, $MnO_2$, $Mn_2O_3$, $Mn_3O_4$, PdO, PtO, $Ag_2O$, $Ag_2O_2$, and $Au_2O_3$ are capable of reacting with the carbon monoxide constituent of the lasing gas mixture to restore that mixture to its original composition and to thus stabilize the output power of the laser.

What is claimed is:

1. In a high power gas transport laser apparatus comprising a fluid channel, a gas mixture including carbon dioxide in said channel, means for moving and recirculating said gas mixture through said channel, means for producing an electric discharge in said gas mixture transversely of the direction of flow, mirror means optically aligned with said discharge for directing a beam of coherent light therethrough, a heat exchanger in said channel for cooling said gas mixture, said channel being closed and having end sections between said electric discharge and said heat exchanger, said end sections having longitudinally curved walls for changing the direction of flow of the gas mixture, the improvement comprising copper on substantially all of the inner surface of said walls of the end section located downstream from said electric discharge.

2. In a high power gas transport laser apparatus comprising a fluid channel, a gas mixture including carbon dioxide in said channel, means for moving and recirculating said gas mixture through said channel, means for producing an electric discharge in said gas mixture transversely of the direction of flow, mirror means optically aligned with said discharge for directing a beam of coherent light therethrough, a heat exchanger in said channel for cooling said gas mixture, said channel being closed and having end sections between said electric discharge and said heat exchanger, said end sections having longitudinally curved walls for changing the direction of flow of the gas mixture, the improvement comprising at least one longitudinally curved gas flow turning vane between and coextensive with said walls of the end section located downstream from said electric discharge, the opposite sides of said vane comprising copper surfaces.

* * * * *